(12) United States Patent
Lee et al.

(10) Patent No.: US 7,700,933 B2
(45) Date of Patent: Apr. 20, 2010

(54) OPTICAL LENS SYSTEM OF MOBILE CAMERA INCLUDING OPTICAL LENS AND PAIR OF IMAGE SENSORS

(75) Inventors: Sang Hyuck Lee, Suwon (KR); Ho Seop Jeong, Seongnam (KR); Ho Sik You, Suwon (KR)

(73) Assignee: Samsung Electro-Mechanics Co., Ltd, Suwon-Si (KR)

( * ) Notice: Subject to any disclaimer, the term of this patent is extended or adjusted under 35 U.S.C. 154(b) by 638 days.

(21) Appl. No.: 11/606,343

(22) Filed: Nov. 30, 2006

(65) Prior Publication Data
US 2007/0132875 A1    Jun. 14, 2007

(30) Foreign Application Priority Data
Dec. 13, 2005    (KR) ...................... 10-2005-0122350

(51) Int. Cl.
G01N 21/86    (2006.01)
G01V 8/00    (2006.01)
(52) U.S. Cl. .................................. 250/559.05; 396/275
(58) Field of Classification Search ............ 250/559.05; 396/324, 275; 352/86
See application file for complete search history.

(56) References Cited

U.S. PATENT DOCUMENTS 5,727,242 A * 3/1998 Lo et al. ...................... 396/324
7,295,375 B2 * 11/2007 Jacobowitz et al. ......... 359/619

FOREIGN PATENT DOCUMENTS

JP    2005-062729    3/2005

* cited by examiner

*Primary Examiner*—Seung C Sohn

(57) ABSTRACT

An optical lens system of a mobile camera is provided. The lens optical system includes: an optical lens in which one pair of incident surfaces corresponding to the divided view angles are adjacently arranged at the center portion, optical beams incident at the divided view angles being transmitted through respective off-axis lens systems; and one pair of image sensors separately arranged under both lower portions of the optical lens to receive the optical beams transmitted through the off-axis lens systems. As one pair of the image sensors is separately arranged on both lower portions of the optical lens, the images formed in the image sensors can be easily combined. Moreover, during the combination of the image, the disparity of the images can be prevented by the narrowed distance between the incident surfaces.

8 Claims, 5 Drawing Sheets

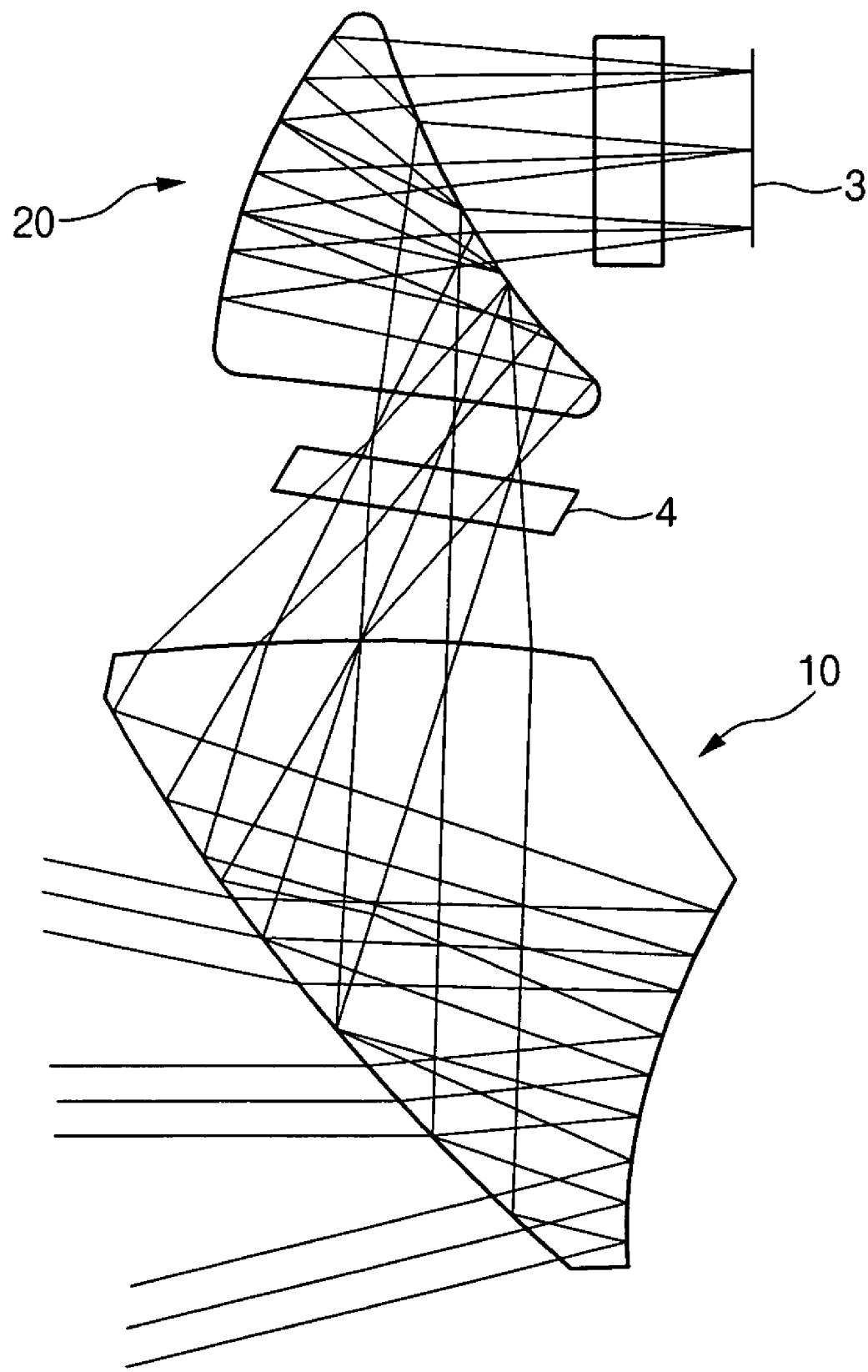
[FIG. 1 – Prior Art]

[FIG. 2 – Prior Art]
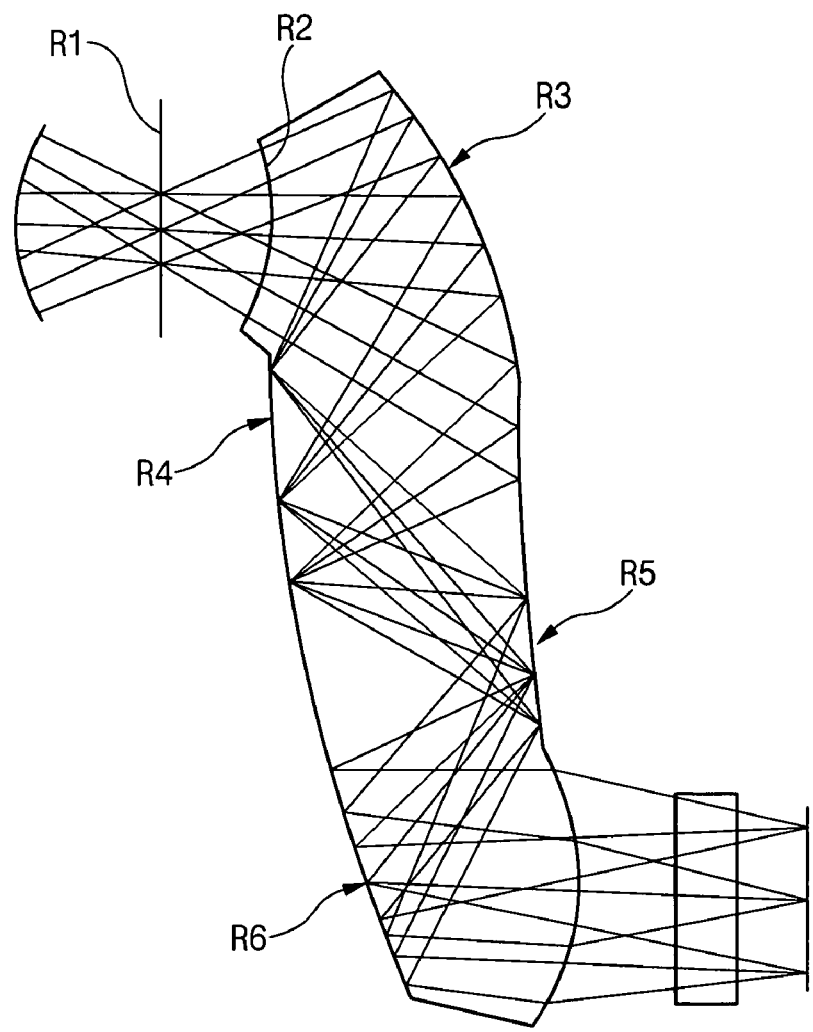
[FIG. 3 – Prior Art]
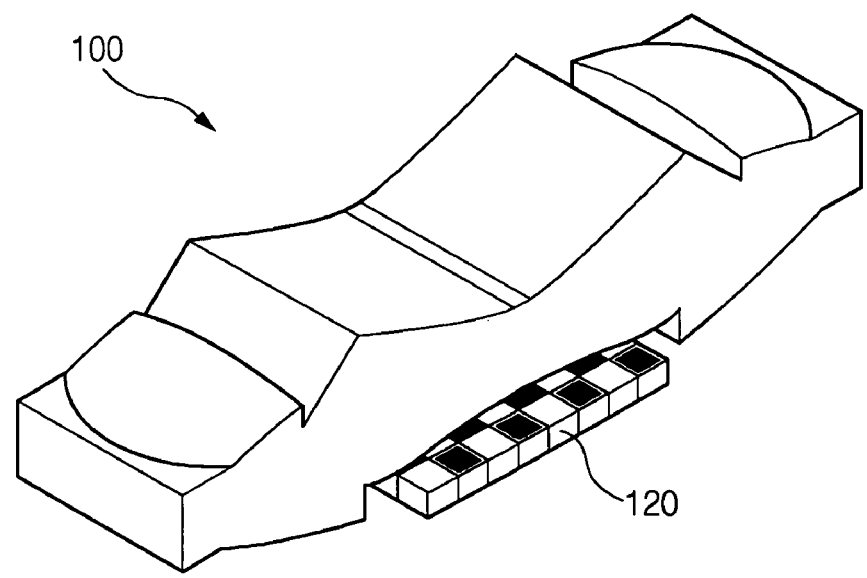

[FIG. 4 – Prior Art]
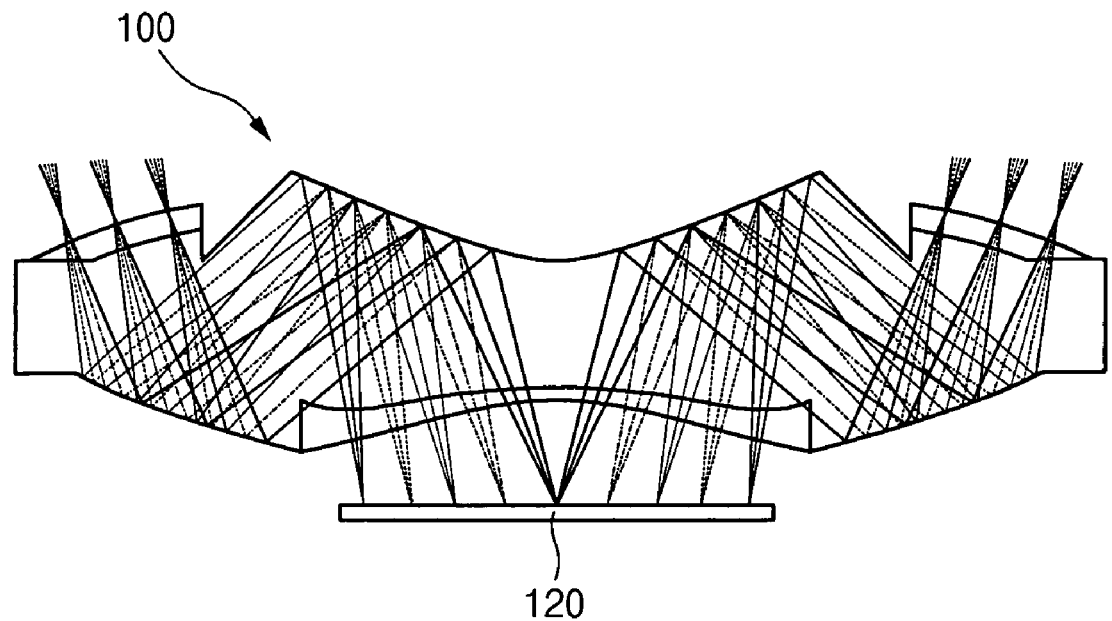
[FIG. 5 – Prior Art]
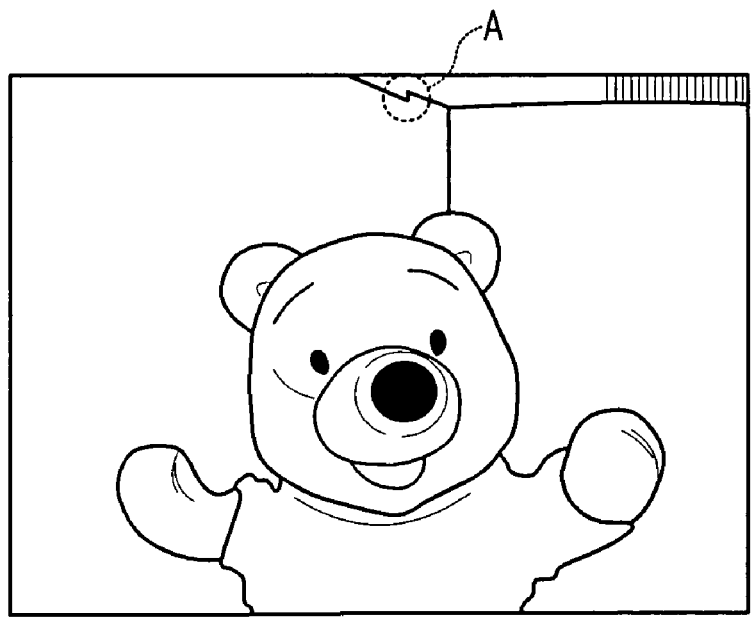

[FIG. 6]
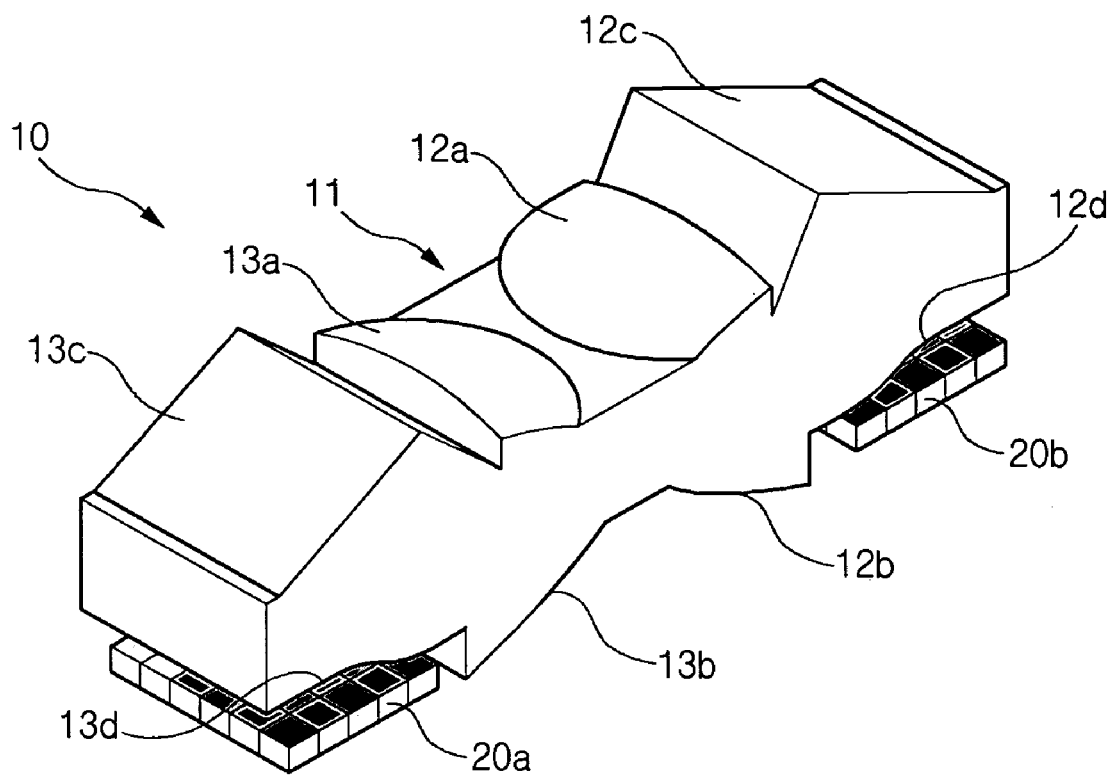
[FIG. 7]
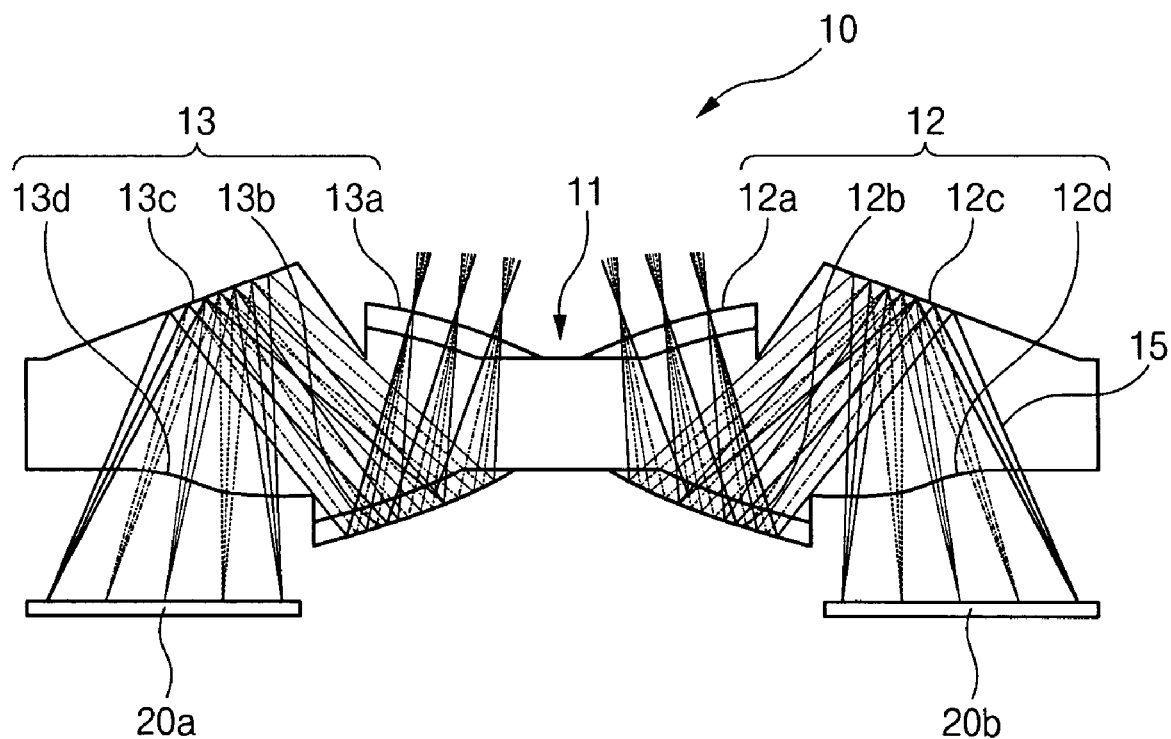

[FIG. 8]
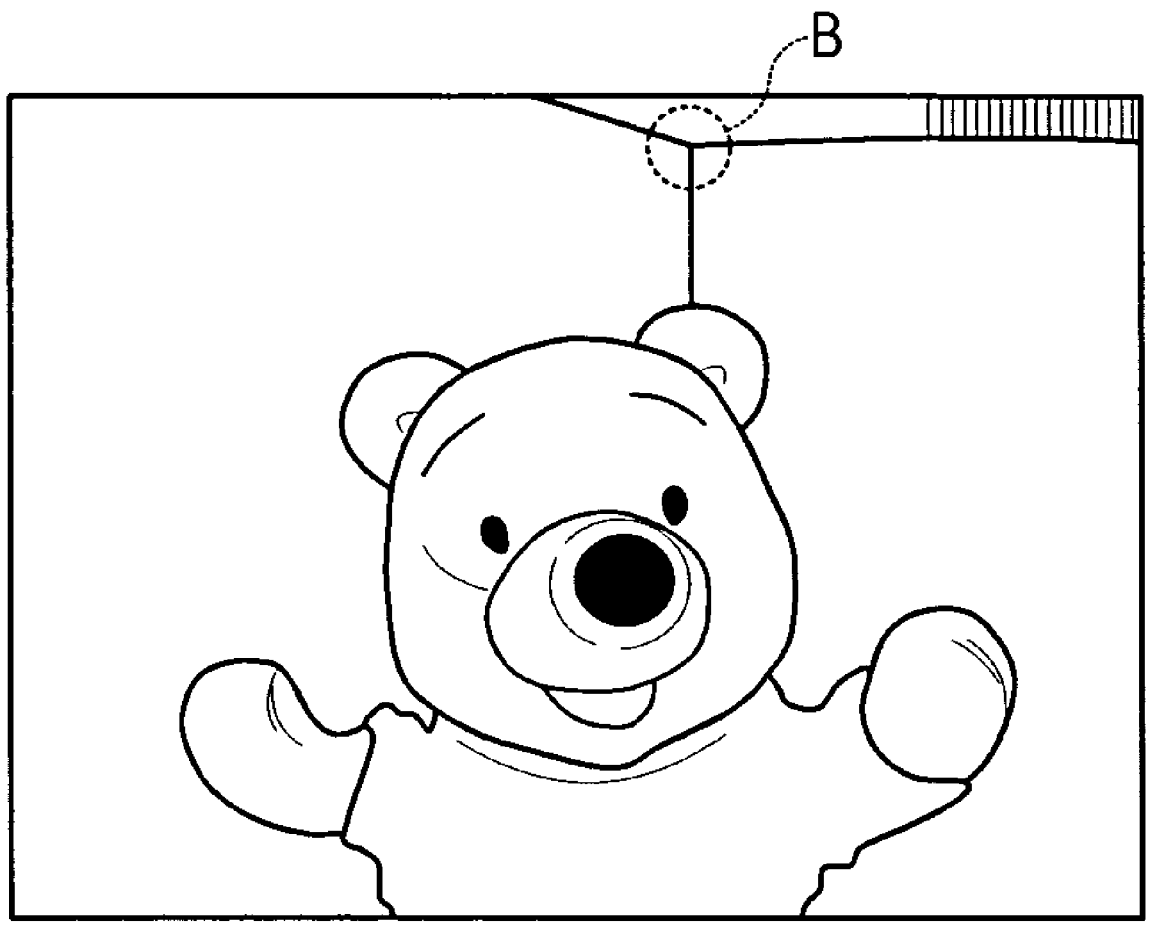

OPTICAL LENS SYSTEM OF MOBILE CAMERA INCLUDING OPTICAL LENS AND PAIR OF IMAGE SENSORS

CROSS-REFERENCE TO RELATED APPLICATIONS

This application claims the benefit of Korean Patent Application No. 2005-122350 filed with the Korean Industrial Property Office on Dec. 13, 2005, the disclosure of which is incorporated herein by reference.

BACKGROUND OF THE INVENTION

1. Field of the Invention

The present invention relates to an optical lens system of a mobile camera. In the optical system of the mobile camera, optical beams incident at the divided view angles are incident on off-axis lenses arranged at the center portion of an optical lens, and image sensors are separately arranged on both sides of the optical lens. Due to the adjacent arrangement of the off-axis lenses, the disparity of the images can be minimized.

2. Description of the Related Art

With the recent development of mobile terminals such as portable phones and personal digital assistants (PDAs), the mobile terminals provide a phone call function and are used as a multi-convergence device having various functions. The most representative of the multi-convergence is a camera module. The resolution of the camera module changes from 300,000 pixels (VGA) to 700,000 pixels. Moreover, the camera module provides various additional functions, such as auto-focusing (AF) and optical zoom.

Generally, compact camera modules (CCMs) are applied to various IT devices, such as camera phones, smart phones, mobile communication terminals, and toy cameras. Recently, products using the CCMs to meet consumers' various tastes are increasingly put on the market.

The camera modules are manufactured using main parts of charge coupled device (CCD) or complementary metal oxide semiconductor (CMOS) image sensors and lenses. Incident light transmitted through the lens is condensed by the image sensor and is stored as data in the memory. The stored data is displayed as an image through a display medium, such as liquid crystal display (LCD) or PC monitor.

Recently, with the development of digital technologies, the improvement of image compression/decompression technologies, and the technical improvement of peripheral devices of multimedia products, lenses for the mobile cameras have been continuously developed and researched for slim profile and miniaturization. To cope with these trends, mobile cameras are required which have the improved performance and the improved portability, as optical systems for ultraslim camera lenses are included therein.

According to the related art, coaxial lenses are widely used as the optical lenses of mobile cameras. In such a conventional coaxial lens, a plurality of rotationally symmetrical lenses are arranged in a longitudinal direction with respect to an optical axis. Therefore, there is a limitation in reducing the thickness of the longitudinally arranged lenses in the optical axis. Specifically, it is very difficult to achieve the miniaturization of the digital mobile devices because the whole length of the image sensor is determined at a level that is almost equal to the diagonal length of the image sensor.

To solve these problems, an optical lens system using prism lens and an optical lens system using a relay-type off-axis image forming lens have been proposed to achieve the miniaturization of the mobile device. An optical lens using a prism lens and an improved optical lens system using a divided off-axis lens system are disclosed in Korean Patent Application No. 10-2005-0073384, filed by the present applicant. Hereinafter, the optical lens and the improved optical lens system will be described with reference to FIGS. 1 and 2.

Referring to FIG. 1, the optical lens system using the prism lens includes a first prism 10, a second prism 20, a low pass filter (LPF) 4, and an image plane 3, thereby constituting an optical system of a mobile camera. A ratio of a whole length of the optical system to a diagonal length of an image sensor is in a range from 2.4 to 4.3. Therefore, the entire length of the optical system can be reduced within a very limited range.

As another example of the related art, the optical lens system using the off-axis image forming lens of FIG. 2 includes a first plane R1, a second plane R2, a third plane R3, a fourth plane R4, a fifth plane R5, and a sixth plane R6. Specifically, the first plane R1 is an aperture, the second plane R2 is a refraction plane on a coaxis with respect to the first plane R1, and the third plane R3 is a reflection plane inclined with respect to the second plane R2. The fourth plane R4 and the fifth plane R5 are reflection planes that are shifted and inclined with respect to the respective front surfaces. The sixth plane R6 is a refraction plane that is shifted and inclined with respect to the fifth plane R5.

In the integrated off-axis image forming lens system, however, the ratio of the whole length of the lens system to the diagonal length of the image sensor is in the range from 2.4 to 4.3. Therefore, there is a great limitation in securing a wide view angle in a single image sensor and reducing the entire thickness of the optical system.

Accordingly, in order to implement a wide angle of view and reduce the whole length of the optical system for the mobile camera, an additional optical lens system, as well as the lens system using the prism or the integrated off-axis image forming lens system, has to be implemented. An optical lens system using two or more off-axis lens systems is disclosed in Korean Patent Application filed on Aug. 10, 2005 by the present applicant. This optical lens system will be described in brief with reference to FIGS. 3 and 4.

FIG. 3 is a perspective view of an optical lens system according to the related art, and FIG. 4 is a sectional view of the optical lens system illustrated in FIG. 3. In the conventional optical lens system, the view angle is equally divided into more than two angles. The optical lens system includes a plurality of off-axis lens systems 100 and a single image sensor 120. The plurality of off-axis lens systems includes lenses provided on both sides, which transmit optical beams incident at the divided view angles. The single image sensor 120 receives the optical beams transmitted through the plurality of lens systems.

The single image sensor 120 includes unit pixels each receiving one of blue (B), red (R) and green (G) colors. The unit pixels are arranged alternately and regularly.

In the optical lens system, the image sensor 120 is disposed at the center portion of the optical lens having one pair of off-axis lens systems 100 symmetrically arranged on both sides. Therefore, the incident surfaces of the off-axis lens systems 100 have to be arranged on both sides. Consequently, as the distance of the incident surfaces becomes far, the disparity of the images according to the distance of the object occurs.

That is, when the perspective image as illustrated in FIG. 5 is captured, the distortion of the images occurs in the background indicated by a reference symbol "A" in the combination of the images formed through the off-axis lens system 100.

SUMMARY OF THE INVENTION

An advantage of the present invention is that it provides an optical lens system of a mobile camera, which can easily combine images and prevent the disparity of images when the images formed in the image sensors are combined. In the optical lens system, the bilateral symmetrical off-axis lens systems having incident surfaces formed at the center portion thereof are provided, and one pair of image sensors is separately arranged on both sides of the off-axis lens systems. The optical beams transmitted through the off-axis lens systems are formed in the respective image sensors.

Additional aspects and advantages of the present general inventive concept will be set forth in part in the description which follows and, in part, will be obvious from the description, or may be learned by practice of the general inventive concept.

According to an aspect of the invention, a lens optical system includes: an optical lens in which one pair of incident surfaces corresponding to the divided view angles are adjacently arranged at the center portion, optical beams incident at the divided view angles being transmitted through respective off-axis lens systems; and one pair of image sensors separately arranged under both lower portions of the optical lens to receive the optical beams transmitted through the off-axis lens systems.

According to another aspect of the present invention, the optical beams incident at the view angles divided by the symmetrical off-axis lens systems having different optical axes are transmitted through the optical lens, and are condensed in the pair of the image sensors corresponding to the respective lens systems, so that the half of image is formed.

The optical beams incident at the divided view angles are incident through one pair of the off-axis lenses that are the incident surfaces disposed at the center portion of the bilaterally symmetrical off-axis lens system, and are reflected within the off-axis lens systems. Then, the optical beams are received in one pair of the image sensors separately arranged under the off-axis lens systems.

One pair of the image sensors is configured to form the images from the optical beams received through the off-axis lens systems. The respective pixels constructing the image sensor surfaces on both sides may be configured with the image sensors having Bayer patterns in which patterns such as GRGR . . . , GBGB . . . are sequentially arranged. Alternatively, the image sensor surface may be separately configured with the image sensors having different color regions.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a schematic diagram of a conventional optical system using a prism lens;

FIG. 2 is a schematic diagram of a conventional optical system using an integrated prism lens;

FIG. 3 is a perspective view of a conventional mobile optical lens system;

FIG. 4 is a sectional view of the conventional mobile optical lens system;

FIG. 5 is a schematic view of an image formed by using the conventional mobile optical lens system;

FIG. 6 is a perspective view of an optical lens system according to the present invention;

FIG. 7 is a sectional view of the optical lens system according to the present invention; and FIG. 8 is a schematic view of an image formed by using the optical lens system according to the present invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, an optical lens system of a mobile camera according to the embodiments of the present invention will be understood more fully with reference to the accompanying drawings.

First, a basic concept about the division of a view angle of a camera will be described. The division of the view angle of the camera is the precondition for constructing the optical lens system according to the present invention. The view angle represents an angle at which the camera lens can capture an object. In the general camera optical system, the view angle is determined at about 60°. The concept about the division of the view angle of the camera is to achieve a view angle of about 60° through the view angle of 30° maintained by using a plurality of cameras having different axes and narrow view angle of about 30°.

That is, in the optical lens system having off-axis lens systems on both sides, the optical beams whose view angles are divided in the mobile camera are incident on the off-axis systems. Therefore, the present invention can have the same effect as the case of using two cameras that maintain narrow angle of view of about 30° by the divided view angles. At this point, the image of the object is condensed in the image sensor through the two off-axis lens systems having the different optical axes, and only the half of image can be obtained through the respective light receiving regions of the image sensor. A process of combining the images formed in the respective light receiving regions through a separate program is required.

In the case of the reverse image, the respective lenses of the off-axis lens system combines the images into one color image by photo stitching or panorama mosaicing.

FIG. 6 is a perspective view of an optical lens system according to the present invention, and FIG. 7 is a sectional view of the optical lens system illustrated in FIG. 6.

Referring to FIGS. 6 and 7, the optical lens system 10 includes an optical lens 11 and one pair of image sensors 20a and 20b. The optical lens 11 includes one pair of off-axis lens systems 12 and 13 that are symmetrically formed such that one pair of incident surfaces 12a and 13a are adjacently arranged at the center portion. The pair of the image sensors 20a and 20b is separately arranged on both sides of the optical lens 11 such that the optical beams 15 transmitted through the off-axis lens systems 12 and 13 are received therein.

The optical beams 15 incident through the off-axis lens systems 12 and 13 of the optical lens 11 are incident through the incident surfaces 12a and 13a with different optical axes at the view angles divided by the mobile camera. Then, the optical beams 15 are received in the pair of the image sensors 20a and 20b disposed on both sides of the optical lens 11 by the repetitive reflections within the off-axis lens systems 12 and 13.

In addition, the optical lens 11 includes the off-axis lens systems 12 and 13 in which one pair of the incident surfaces 12a and 13a are bilaterally symmetrical, the incident surfaces 12a and 13a being adjacent to the center portion. The respective off-axis lens systems 12 and 13 are integrally connected in series, such that the optical beams 15 transmitted through the off-axis lens systems 12 and 13 are incident at the relatively narrow view angles.

The optical lens 11 is divided into the first off-axis lens system 12 with the incident surface 12a and the second off-axis system 13 with the incident surface 13a. The first off-axis lens system 12 and the second off-axis lens system 13 are symmetrical with each other. The optical beams 15 are incident through the incident surfaces 12a and 13a adjacent to each other within the off-axis lens systems 12 and 13, and are emitted to the outer lower portions of the off-axis lens systems 12 and 13 by the repetitive reflections through a plurality of lens surfaces of the respective off-axis lens systems. Then, the optical beams 15 are simultaneously condensed in the pair of the image sensors 20a and 20b disposed under the off-axis lens systems 12 and 13, so that the individual images are formed on the image sensors 12 and 13. At this point, the optical lens 11 can be mass-produced by injection molding and wafer scale.

The off-axis lens systems 12 to 13 of the optical lens 11 have a plurality of lens surfaces 12a to 12d and 13a to 13d and are bilaterally symmetrical to one another. In more detail, the off-axis lens system 12 includes an incident surface 12a, a lower reflection surface 12b, an upper reflection surface 12c, and an exit surface 12d disposed at an outer lower portion.

At this point, the optical beams 15 incident through the optical lens 11 are independently formed on the image sensors 20a and 20b, thereby acquiring the image of the object. In this process, the optical beams 15 are incident at the relatively narrow view angle of about 30°, which is divided by the mobile camera using the lens optical system 10 of the present invention. Then, the optical beams 15 are incident through the incident surfaces 12a and 13a of the pair of the off-axis lenses disposed at the center portion of the first and second off-axis lens systems 12 and 13. Then, the optical beams 15 are sequentially reflected from the lower reflection surfaces 12b and 13b and the upper reflection surfaces 12c and 13c at an angle perpendicular to the incident angle and are transmitted through the exit surfaces 12d and 13d. The optical beams 15 transmitted through the respective off-axis lens systems 12 and 13 are condensed in the image sensors 20a and 20b separately arranged under the off-axis lens systems 12 and 13. In this manner, the images are formed in the image sensors 20a and 20b by halves.

The image sensors 20a and 20b where the images of the optical beams 15 transmitted through the off-axis lens systems 12 and 13 are formed are separately arranged under the exit surfaces 12d and 13d of the off-axis lens systems 12 and 13. The image sensors 12 and 13 are configured with Bayer pattern in which red, green and blue colors are regularly arranged.

In addition, the image sensor 20a may be configured with the green light receiving region where only the green color is received, and the other image sensor 20b may be configured with the mixed light receiving region where the red color and the blue color are mixed.

In the image sensors 20a and 20b, the optical beams 15 are incident on the incident surfaces 12a and 13a and are repetitively reflected and emitted within the off-axis lens systems 12 and 13. The optical beams 15 are condensed in the image sensors 20a and 20b corresponding to the respective off-axis lens systems 12 and 13, so that only the half of image is formed in each of the image sensors 20a and 20b. The images formed by the respective off-axis lens systems 12 and 13 are combined into one image through a separate program. In the case of the inverse image, the off-axis lens systems 12 and 13 combine the divided images into one image by using photo stitching or panorama mosaicing. In the case of the erect image, the off-axis lens systems 12 and 13 combine the divided images into one image by the precise adjustment of the lenses.

When the images formed in the pair of the image sensors 20a and 20b are combined, the image is finally formed as illustrated in FIG. 8. The images can be combined without distortion at the position B that forms the background of the object.

In the optical lens having the symmetrical off-axis lens systems according to the related art, the incident surfaces where the optical beams incident at the divided view angles are transmitted have to be disposed on both sides of the optical lens. Therefore, in combining the images, the fine distortion of the background inevitably occurs due to the distance difference between the incident surfaces 12a and 13a. According to the present invention, however, the incident surfaces disposed at the off-axis lens systems 12 and 13 of the optical lens 11 are arranged adjacent to the center portion. Therefore, the range of the divided view angles guiding the incident paths of the optical beams 15 incident through the incident surfaces 12a and 13a becomes narrow. Further, the image sensors 20a and 20b forming the images of the optical beams 15 transmitted through the off-axis lens systems 12 and 13 are separately arranged on both lower portions of the optical lens 10. Therefore, the divided angels of the optical beams 15 incident toward the optical lens 11 are reduced. Consequently, the images can be easily combined and the disparity of the corresponding portions in the combination of the images can be prevented.

As described above, because the divided view angles are narrow, the incident surfaces of the optical beams are arranged in parallel at the center portion when the plurality of off-axis lens systems corresponding to the divided view angles are symmetrically formed. One pair of the image sensors is separately arranged on both lower portions of the optical lens. Therefore, the images formed in the image sensors can be easily combined. Moreover, during the combination of the image, the disparity of the images can be prevented by the narrowed distance between the incident surfaces.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A lens optical system in which optical beams are incident at view angles divided into a plurality of equal angles by a mobile camera, comprising:

an optical lens in which one pair of incident surfaces corresponding to the divided view angles are adjacently arranged at the center portion, optical beams incident at the divided view angles being transmitted through respective off-axis lens systems; and one pair of image sensors separately arranged under both lower portions of the optical lens to receive the optical beams transmitted through the off-axis lens systems, wherein the pair of image sensors includes an image sensor having a green light receiving region where only a green color is received, and an other image sensor having a mixed light receiving region where red and blue colors are alternately mixed.

2. The lens optical system according to claim 1,
wherein the optical beams incident at the view angles divided by the symmetrical off-axis lens systems having different optical axes are transmitted through the optical lens, and are condensed in the pair of the image sensors corresponding to the respective lens systems, so that the half of image is formed.

3. The lens optical system according to claim 2, wherein the optical lens is manufactured by injection molding and wafer scale.

4. The lens optical system according to claim 2, wherein the optical beams incident through the incident surfaces of the respective off-axis lens systems are repetitively reflected on a plurality of lens surfaces, such that the optical beams are simultaneously incident on the pair of the image sensors disposed under the exit surfaces of the off-axis lens systems.

5. The lens optical system according to claim 1, wherein the optical beams incident through the incident surfaces of the respective off-axis lens systems are repetitively reflected on a plurality of lens surfaces, such that the optical beams are simultaneously incident on the pair of the image sensors disposed under the exit surfaces of the off-axis lens systems.

6. The lens optical system according to claim 1, wherein each of the off-axis lens systems, formed in a bilateral symmetry with a plurality of lens surfaces, includes an upper reflection surface, a lower reflection surface, an incident surface on which the divided optical beams are incident, an exit surface through which the optical beams reflected from the reflection surfaces are transmitted, the incident surfaces are adjacently arranged at the center portion, and the exit surfaces are arranged at sides of the off-axis lens systems.

7. The lens optical system according to claim 1, wherein the images formed in the respective light receiving regions of the image sensors are combined into one color image by photo stitching or panorama mosaicing.

8. The lens optical system according to claim 1, wherein the images formed in the respective light receiving regions of the image sensors are combined into one color image by photo stitching or panorama mosaicing.

* * * * *